United States Patent
Schnittger et al.

(10) Patent No.: US 12,322,846 B2
(45) Date of Patent: Jun. 3, 2025

(54) FUEL CELL SYSTEM

(71) Applicant: Robert Bosch GmbH, Stuttgart (DE)

(72) Inventors: Dirk Schnittger, Ludwigsburg (DE);
Friedrich Howey, Ditzingen (DE);
Rolf-Peter Essling, Reudern (DE);
Wolfgang Weissgerber, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 624 days.

(21) Appl. No.: 17/627,882

(22) PCT Filed: Jun. 9, 2020

(86) PCT No.: PCT/EP2020/065926
§ 371 (c)(1),
(2) Date: Jan. 18, 2022

(87) PCT Pub. No.: WO2021/013423
PCT Pub. Date: Jan. 28, 2021

(65) Prior Publication Data
US 2022/0255108 A1    Aug. 11, 2022

(30) Foreign Application Priority Data
Jul. 19, 2019   (DE) ............... 10 2019 210 717.6

(51) Int. Cl.
*H01M 8/2475*   (2016.01)
*H01M 8/248*    (2016.01)

(52) U.S. Cl.
CPC ......... *H01M 8/2475* (2013.01); *H01M 8/248* (2013.01)

(58) Field of Classification Search
CPC .................. H01M 8/248; H01M 8/2475
See application file for complete search history.

(56) References Cited

FOREIGN PATENT DOCUMENTS

| DE | 102007021018 A1 | 11/2008 |
| DE | 102010006705 B3 | 4/2011 |
| DE | 102014017952 A1 | 6/2016 |
| DE | 102014017953 A1 | 6/2016 |
| DE | 102016004283 A1 | 10/2017 |

OTHER PUBLICATIONS

Machine Translation of: DE 102016004283 A, Mankel, Oct. 12, 2017.*
Translation of International Search Report for Application No. PCT/EP2020/065926 dated Sep. 11, 2020 (3 pages).

* cited by examiner

*Primary Examiner* — Kenneth J Douyette
(74) *Attorney, Agent, or Firm* — Michael Best & Friedrich LLP

(57) ABSTRACT

The invention relates to a fuel cell system comprising a fuel cell stack (2) received in a first housing (1) and an energy supply unit received in a second housing (3), the two housings (1, 3) being connected or being capable of being connected in such a manner that openings (4, 5) provided in the housings (1, 3) are opposite one another and overlap, at least in part. According to the invention, an insert (6), which surrounds a pin or sleeve-shaped contact element (7) is arranged in the area of two opposing and at least in part overlapping openings (4, 5), wherein the insert (6) directly, or indirectly via a sealing ring (8), encloses the contact element (7) in a watertight manner and isolates same electrically at least against one of the two housings (1, 3).

12 Claims, 5 Drawing Sheets

FUEL CELL SYSTEM

BACKGROUND OF THE INVENTION

The present invention relates to a fuel cell system, comprising a fuel cell stack which is received in a first housing and an energy supply unit which is received in a second housing.

In a fuel cell system for mobile applications, a fuel cell stack has to be supplied with energy, that is to say has to be connected to a power supply of the system. The connection can be established, for example, with the aid of a high voltage plug or with the aid of a simple high-voltage cable. Since the fuel cell stack is usually surrounded by a housing, the plug or the cable has to be routed through the housing.

Instead of a high voltage plug or high-voltage cable, the connection of the fuel cell stack to the power supply of the system can also be realized via an energy supply unit, what is known as the "Power Distribution Unit" (PDU). The latter has a dedicated housing which is fastened to the housing of the fuel cell stack in such a way that an opening which is configured in the housing of the energy supply unit lies opposite an opening of the other housing. An electrical connection can then be established by the openings with the aid of contact elements. Since the latter conduct current, the housings have to be protected against the ingress of water.

SUMMARY OF THE INVENTION

The present invention is concerned with this object.

In order to achieve the object, the fuel cell system according to the invention is proposed. Advantageous developments of the invention can be gathered from the subclaims.

The proposed fuel cell system comprises a fuel cell stack which is received in a first housing and an energy supply unit which is received in a second housing. Here, the two housings are connected or connectable in such a way that openings which are provided in the housings lie opposite one another and overlap one another at least in regions. According to the invention, an intermediate piece is arranged in the region of two openings which lie opposite one another and overlap at least in regions, which intermediate piece surrounds a pin-shaped or sleeve-shaped contact element, the intermediate piece enclosing the contact element directly or indirectly via a sealing ring in a water-tight manner and insulating it electrically at least with respect to one of the two housings.

The intermediate piece of the proposed fuel cell system has a plurality of functions, namely that of sealing and that of electrical insulation. Therefore, the intermediate piece is manufactured, at least in regions, from a water-tight and electrically insulating material, for example from plastic. The sealing action with respect to the pin-shaped or sleeve-shaped contact element which serves for electrical contacting and is therefore electrically conducting can be brought about by way of the intermediate piece itself or by way of a sealing ring. If the sealing ring is dispensed with, the intermediate piece preferably bears against the contact element via a radial prestress. The electrical insulation of the contact element with respect to at least one of the two housings by way of the intermediate piece presupposes that the intermediate piece is in direct or indirect (for example, via a sealing element) contact with the at least one housing. If this contact is peripheral, a sealing action of the housing can be brought about at the same time by way of the intermediate piece.

Therefore, in accordance with one preferred embodiment of the invention, the intermediate piece adjoins at least one housing in a water-tight manner directly or indirectly via a peripheral sealing element. Accordingly, at least one further sealing level is provided on the intermediate piece, in which further sealing level a sealing contact with one of the two housings is realized directly or indirectly via a peripheral sealing element. At least two further sealing levels are preferably provided, in the region of which the intermediate piece is in sealing contact with the two housings, in each case directly or indirectly via a peripheral sealing element.

If the sealing contact between the intermediate piece and a housing is established indirectly via a sealing element, it is proposed that the sealing element is received in a peripheral groove of the intermediate piece. The sealing element is secured in its position by way of it being received in a groove.

In one advantageous refinement, the intermediate piece has an outer contour, which is stepped once or multiple times, and configures at least one peripheral shoulder. Support of the intermediate piece on at least one housing can be realized via the at least one shoulder. If this is the case, the intermediate piece engages around the housing, with the result that, furthermore, the sealing action is improved. If a plurality of sealing levels are configured on the intermediate piece, they can be distributed to different peripheral regions of the intermediate piece. As an alternative or in addition, an axial seal can be realized in the region of a shoulder.

Furthermore, at least one housing preferably comprises a collar section which delimits the opening. The collar section stabilizes the housing in the region of the opening, since the dimensional rigidity of the housing wall which adjoins the opening is increased by way of the collar section. Therefore, the two housings preferably in each case have a collar section which delimits the opening. Furthermore, if desired, the sealing contact between the intermediate piece and the respective housing can be increased with the aid of a collar section. If the sealing contact is established indirectly via a peripheral sealing element, the collar section increases the bearing area for the sealing element, with the result that the position of the intermediate piece in relation to the housing can be varied during assembly.

If the two housings in each case have a collar section which delimits the opening, they can also interact sealingly, with the result that a sealing level on the intermediate piece can possibly be dispensed with. In this case, the two collar sections are preferably arranged on opposite sides of the two housings, one collar section engaging into the other collar section, with the result that a peripheral sealing contact is configured directly or indirectly via a sealing element.

It is proposed in one development of the invention that the pin-shaped or sleeve-shaped contact element is supported at at least one end on a busbar for electrical contacting of the fuel cell stack and/or the energy supply unit. At least that end of the contact element which faces the fuel cell stack is advantageously supported on a busbar. Via the busbar, the electrical connection to the fuel cell stack can then be established. If the busbar is guided onto the fuel cell stack in an arcuate manner, tolerance compensation can be brought about at the same time with the aid of the busbar. Tolerances can be due both to settling operations during the operating time and to thermal expansion.

A tie rod is preferably guided through the sleeve-shaped contact element and the at least one busbar, which tie rod is fixed by a locking element at at least one end. The at least one busbar can be pulled onto the contact element with the aid of the tie rod which is fixed by a locking element. In this way, an electrical contact between the at least one busbar and the sleeve-shaped contact element is ensured in the long term. At the same time, the tie rod facilitates the assembly.

A sealing ring is preferably arranged between the tie rod and the contact element. The sealing ring ensures that no water is capable of penetrating into the housing via the annular gap between the tie rod and the contact element.

For locking purposes, at least one end, the tie rod can be screwed or pressed into a locking element. The locking element can be, for example, a nut, into which the tie rod is screwed. The busbar can be pulled onto the contact element via the tightening force during screwing. In this case, the nut configures an abutment. As an alternative, the end of the tie rod can be pressed into a ring or into a sleeve. Here, the press-in-depth can ensure that the busbar comes to bear against the contact element.

The contact element is advantageously supported at its two ends in each case on a busbar, and a tie rod is inserted into the contact element and the two busbars, with the result that the tie rod protrudes beyond the busbars. A first end of the tie rod can be screwed or pressed into a first locking element. After assembly has taken place, a further locking element can be screwed or pressed onto the other end of the tie rod. With the aid of the two locking elements, the tie rod holds all the current-conducting parts together.

As an alternative, the tie rod can also be configured in one piece with a locking element. This then configures an abutment which is connected fixedly to the tie rod, in particular is connected fixedly to it for conjoint rotation. After assembly of the tie rod has taken place, a further locking element can be screwed or pressed onto the free end, in order to pull the at least one busbar onto the contact element.

In order to optimize the screw connection or press joint between the tie rod and the at least one locking element, the at least one locking element is preferably manufactured from a metallic material. That is to say, the locking element is electrically conducting.

It is therefore proposed in one development of the invention that the locking element is surrounded by an insulating body. The insulating body brings it about that the locking element is insulated electrically. Furthermore, it is proposed that the locking element is held in a direction parallel to the tie rod in the insulating body by way of an end section of the busbar, which end section protrudes into the insulating body. This means that the locking element is first of all inserted from the front into the insulating body. Subsequently, the free end of the busbar is pushed from the side into the insulating body, and the sleeve-shaped contact element is placed from the front onto the busbar. After this, the tie rod is screwed or pressed into the locking element through the sleeve-shaped contact element and the busbar, with the result that all the parts including the insulating body are held captively via this.

If the tie rod is to be screwed into the locking element, it has to be ensured that the locking element is secured against rotation. It is therefore proposed as a further development measure that the locking element is secured against rotation by way of the insulating body. For example, the locking element can be a nut which has an angular, in particular hexagonal, outer contour. A receptacle for the locking element can be configured in the insulating body, which receptacle has an inner contour which is adapted to the outer contour of the locking element. In this way, an anti-rotation safeguard is brought about by way of simple means.

The fuel cell stack preferably comprises two voltage connectors for a positive terminal and a negative terminal. The voltage connectors are connected in an electrically conducting manner in each case via a busbar and a pin-shaped or sleeve-shaped contact element to a busbar of the energy supply unit. The high voltage potentials between the two terminal and relative to the housings are secured sufficiently by way of the electrically insulating intermediate piece which receives the two contact elements. Furthermore, the intermediate piece prevents, via the different sealing levels, water from penetrating into the housings. The intermediate piece is preferably manufactured from a water-impermeable and gas-impermeable material, with the result that the intermediate piece at the same time prevents a gas exchange between the two housings. This is because there is as a rule a higher ambient humidity in the housing, in which the fuel cell stack is received, than in the housing of the energy supply unit, which is to be traced back to the fact that moisture or water exits from the fuel cell stack. Hydrogen can likewise be present in the housing of the fuel cell stack. This hydrogen must not pass into the housing of the energy supply unit, since there are ignition sources here and an ignitable mixture might be formed. The sealing action which is brought about with the aid of the intermediate piece ensures that the electronic components of the energy supply unit are not damaged on account of moisture which occurs and/or gases which enter do not lead to a source of danger.

BRIEF DESCRIPTION OF THE DRAWINGS

In the following text, the invention will be described in greater detail on the basis of the appended drawings, in which.

DETAILED DESCRIPTION

Figure 1:
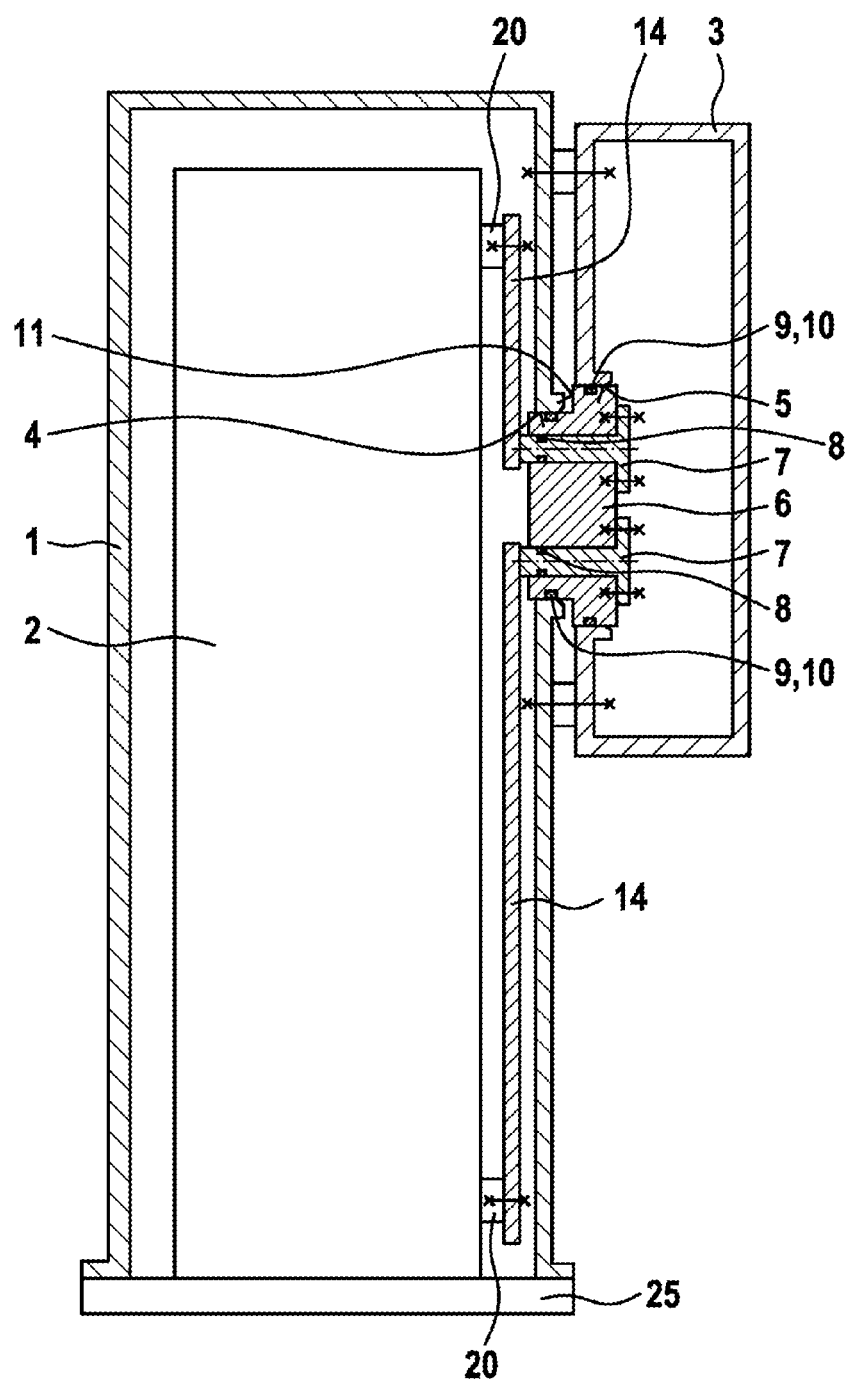
FIG. 1 shows a diagrammatic longitudinal section through a fuel cell system according to the invention in accordance with a first preferred embodiment.

The fuel cell system which is shown in FIG. 1 comprises a fuel cell stack 2 which is arranged on a base plate 25 and is surrounded by a housing 1. On the sides, the fuel cell stack 2 comprises two voltage connectors 20 for a positive terminal and a negative terminal. The voltage connectors 20 are connected in each case to a busbar 14. A pin-shaped or sleeve-shaped contact element 7 which serves for electrical contacting with current-conducting parts of an energy supply unit of the system is supported in each case at the free ends of the busbars 14. To this end, the contact elements 7 are routed out of the housing 1 via an opening 4 which is configured laterally in the housing 1.

The energy supply unit comprises a housing 3 which is screwed laterally onto the housing 1 of the fuel cell stack 2 and has an opening 5 which lies opposite the opening 4 of the housing 1. Therefore, the contact elements 7 protrude through the opening 5 into the housing 3 of the energy supply unit.

Figure 2:
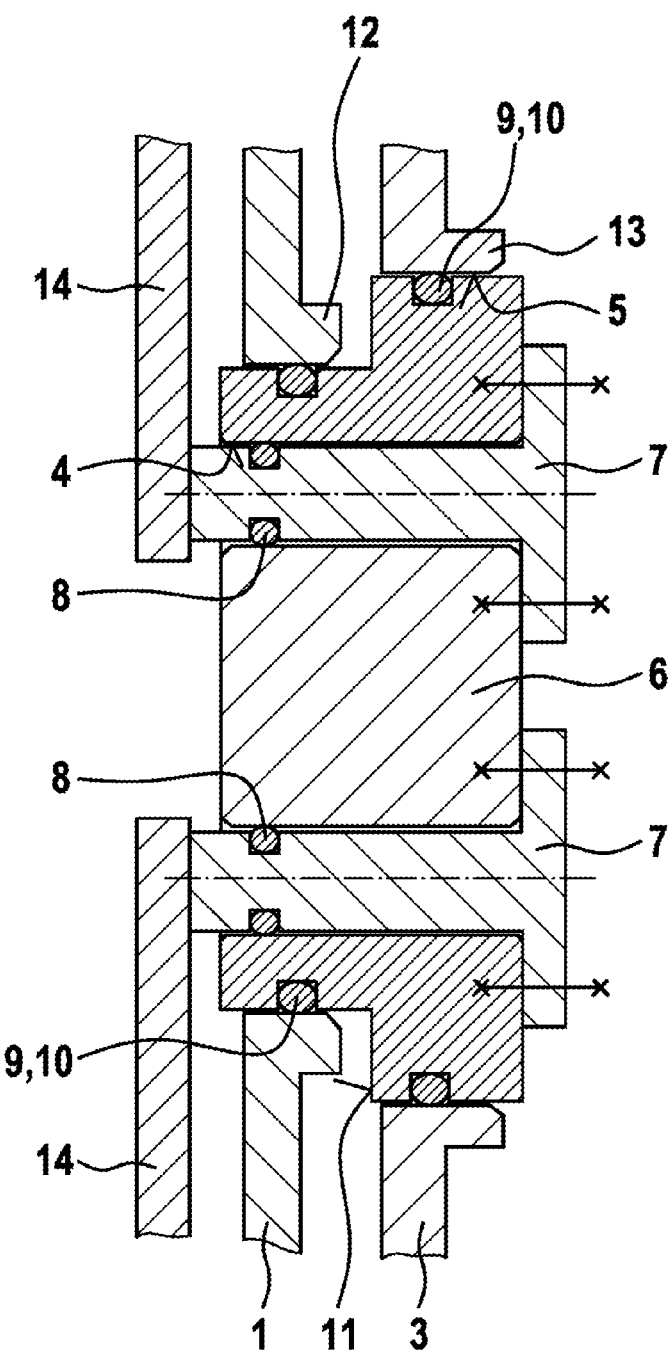
FIG. 2 shows an enlarged detail of FIG. 1 in the region of an intermediate piece which is inserted between two housings.

As can be gathered from FIG. 2, in particular, the two contact elements 7 are surrounded by an intermediate piece 6 which serves for electrical insulation and sealing. To this end, the intermediate piece 6 is manufactured from a material which is electrically insulating and tight with respect to water and gas. Via sealing rings 8, the intermediate piece 6 bears sealingly against the two contact elements 7. Via peripheral sealing elements 9 which are arranged in grooves 10 of the intermediate piece 6, the intermediate piece 6 additionally bears sealingly against the two housings 1, 3.

Figure 3:
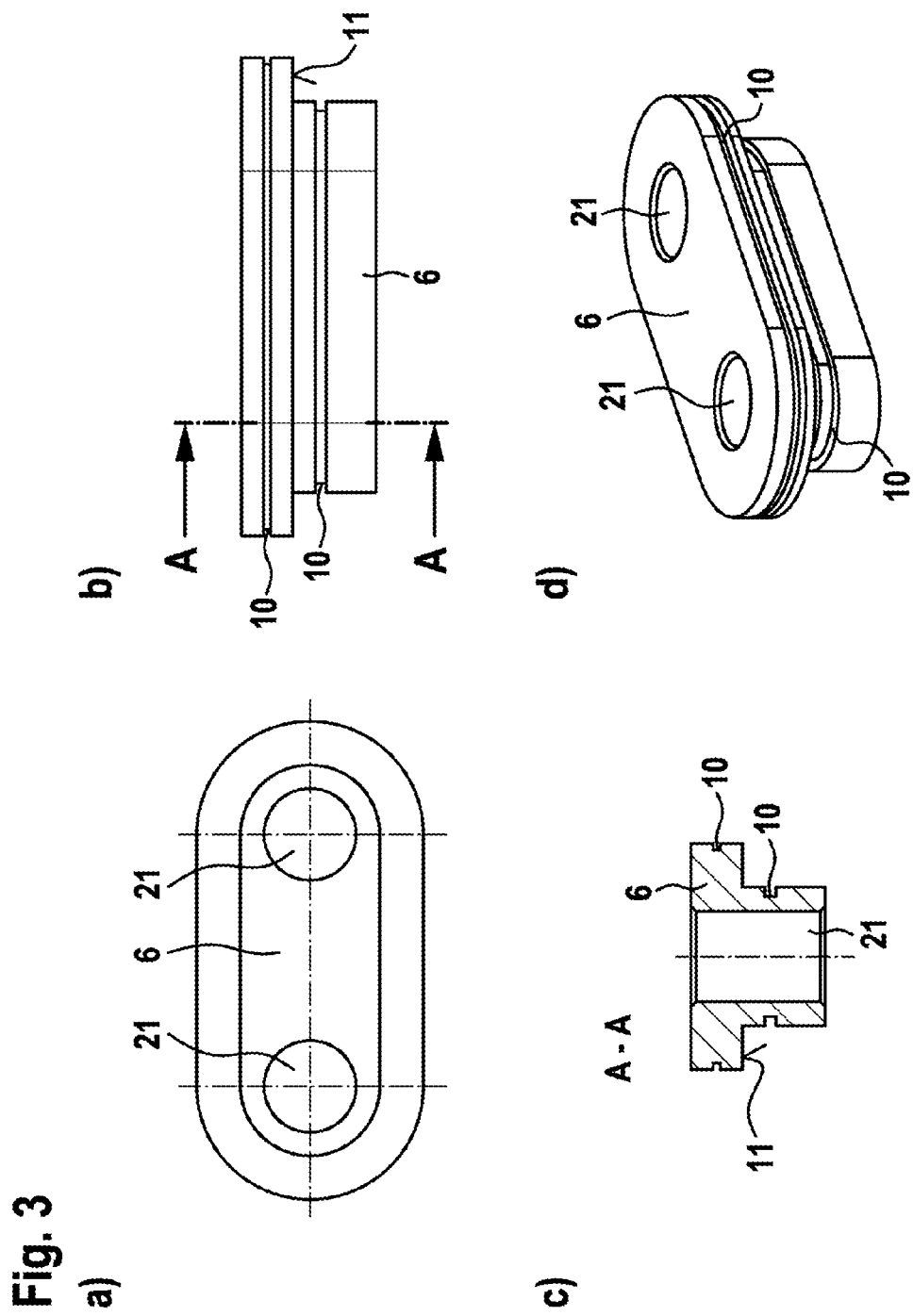
FIG. 3 shows different illustrations of the intermediate piece of the fuel cell system of FIG. 1, including
a) a top view,
b) a side view,
c) a cross section and
d) a perspective illustration.

As can be gathered from FIGS. 3 a) to d), in particular, the intermediate piece 6 has a stepped outer contour, with the result that a peripheral shoulder 11 is configured which separates two different peripheral regions. The dimensions of the two peripheral regions are adapted to the dimensions of the two openings 4, 5. A peripheral groove 10 for receiving a peripheral sealing element 9 is configured in each peripheral region.

The intermediate piece 6 comprises two receptacles 21 for the contact elements 7. The dimensions of the receptacles 21 are therefore adapted to the dimensions of the contact elements 7. As an alternative to the embodiment shown of an intermediate piece 6 which comprises two receptacles 21, the intermediate piece 6 can also comprise only one receptacle 21 for a contact element 7. In this case, each contact element 7 can be surrounded by a dedicated intermediate piece 6 and can be electrically insulated with respect to the housings 1, 3. In each case two openings 4 and two openings 5, respectively, are then provided in the two housings 1, 3. The two intermediate pieces 6 can then be configured in each case as rotationally symmetrical bodies.

As can be gathered from FIG. 2, in particular, the openings 4, 5 which are configured in the housings 1, 3 are delimited in each case by way of a collar section 12, 13. The collar sections 12, 13 increase the dimensional rigidity of the housings 1, 3 in the region of the openings 4, 5. At the same time, the collar sections 12, 13 configure enlarged bearing areas for the peripheral sealing elements 9 which are received in the grooves 10 of the intermediate piece 6.

Figure 4:
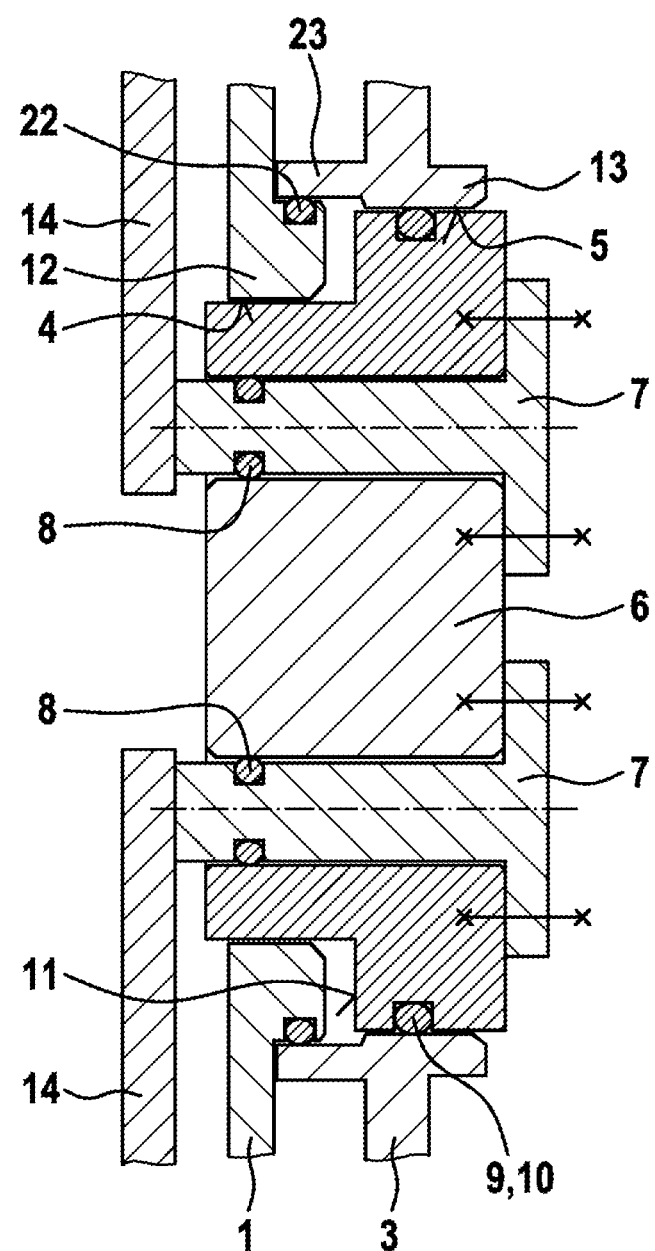
FIG. 4 shows a diagrammatic longitudinal section through a fuel cell system according to the invention in accordance with a second preferred embodiment.

A second preferred embodiment of a fuel cell system according to the invention is shown in FIG. 4. Here, the housing 3 of the energy supply unit comprises two collar sections 13, 23 which are arranged on opposite sides. The collar section 23 therefore faces the collar section 12 of the first housing 1. The dimensions of the collar sections 23, 12 are selected in such a way that a collar section 12 of the first housing 1 engages into the collar section 23. In addition, the collar section 12 bears sealingly against the collar section 23 via a peripheral sealing element 22, with the result that the new sealing level between the two housings 1, 3 is produced. The sealing level between the first housing 1 and the intermediate piece 6 can therefore be dispensed with. Accordingly, the intermediate piece 6 comprises only one peripheral groove 10 with a sealing element 9 which is inserted into it and bears sealingly against the housing 3 of the energy supply unit.

Figure 5:
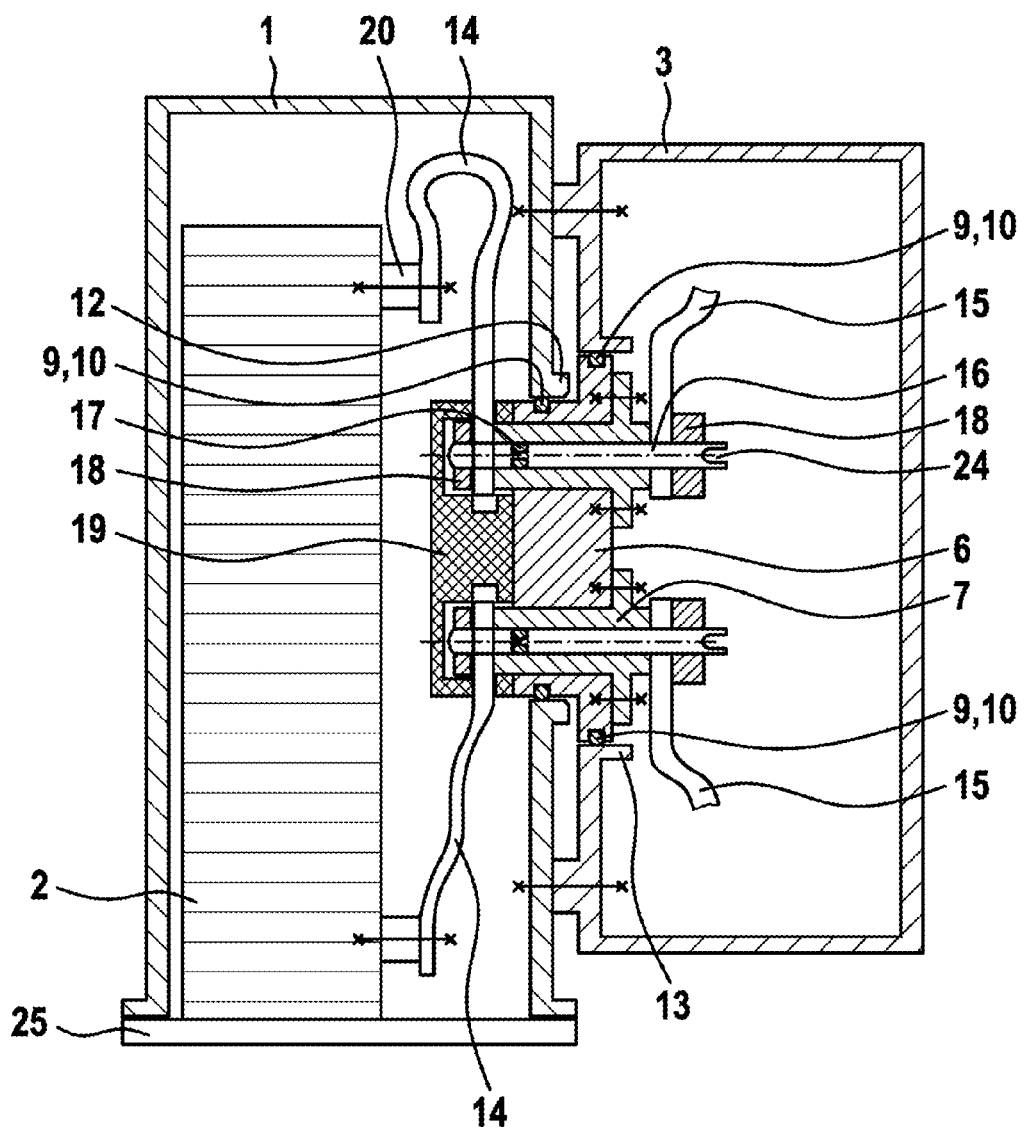
FIG. 5 shows a diagrammatic longitudinal section through a fuel cell system according to the invention in accordance with a third preferred embodiment.

A third preferred embodiment of a fuel cell system according to the invention is shown in FIG. 5. Here, the contact elements 7 are of sleeve-shaped configuration and are supported at the two ends in each case on a busbar 14, 15. Tie rods 16 are guided through the contact elements 7 and the busbars 14, 15, and are connected at the two ends to locking elements 17 in the form of nuts. Sealing rings 17 which are arranged on the tie rods 16 seal the gap between the tie rods 16 and the contact elements 7, with the result that this embodiment is also water-tight and gas-tight.

The locking elements 18 or nuts which face the fuel cell stack 2 are surrounded by an insulating body 19 which serves for electrical insulation. At the same time, the insulating body 19 serves as an assembly aid. The insulating body 19 including the nuts is held captively by way of the laterally engaging busbars 14.

During assembly, the nuts are inserted from the front into the insulating body 19. Subsequently, the insulating body 19 is pushed in each case from the side onto the end sections of the two busbars 14. After this, the intermediate piece 9 can be inserted with the two contact elements 7 into the opening 4 of the housing 1, with the result that the sealing element 9 bears sealingly against the collar section 12 of the housing 1. The tie rods 16 are introduced through the contact elements 7 and the busbars 14 and are screwed into the nuts which are received in the insulating body 19. Subsequently, the busbars 15 can be positioned and the further nuts can be screwed on. In order to generate a torque, a recess 24 for receiving a tool is provided in each case on the end side in the tie rods 16.

As an alternative to the illustration of FIG. 5, the two housings 1, 3 can also be of analogous configuration with respect to the embodiment of FIG. 4. Furthermore, the intermediate piece 6 can comprise only one receptacle 21 for an individual contact element 7.

Further modifications are conceivable unless they are inconsistent with the following patent claims.

The invention claimed is:

1. A fuel cell system, comprising a fuel cell stack which is received in a first housing and an energy supply unit which is received in a second housing, the two housings being connected or configured to be connected in such a way that first and second openings which are provided in the first and second housings, respectively, lie opposite one another and overlap one another at least in regions,
    wherein an intermediate piece is arranged in a region of first and second openings, which intermediate piece surrounds a pin-shaped or sleeve-shaped contact element, the intermediate piece enclosing the pin-shaped or sleeve-shaped contact element directly or indirectly via a sealing ring in a water-tight manner and insulating the pin-shaped or sleeve-shaped contact element electrically at least with respect to one of the first and second housings,
    wherein the pin-shaped or sleeve-shaped contact element is supported at at least one end on a busbar for electrical contacting of the fuel cell stack and/or the energy supply unit, and
    wherein a tie rod is guided through the pin-shaped or sleeve-shaped contact element and the busbar, which tie rod is fixed by a locking element at at least one end.

2. The fuel cell system as claimed in claim 1,
    wherein the intermediate piece adjoins at least one of the first and second housings in a water-tight manner directly or indirectly via a peripheral sealing element.

3. The fuel cell system as claimed in claim 1,
    wherein the intermediate piece has an outer contour, which is stepped once or multiple times, and configures at least one peripheral shoulder.

4. The fuel cell system as claimed in claim 1,
    wherein at least one of the first and second housings comprises a collar section which delimits a respective one of the first and second openings.

5. The fuel cell system as claimed in claim 1,
wherein at at least one end, the tie rod is screwed or pressed into the locking element or is configured in one piece with the locking element.

6. The fuel cell system as claimed in claim 5,
wherein the locking element is surrounded by an insulating body.

7. The fuel cell system as claimed in claim 6,
wherein the locking element is secured against rotation by way of the insulating body.

8. The fuel cell system as claimed in claim 1,
wherein the fuel cell stack comprises two voltage connectors which are connected in an electrically conducting manner in each case via the busbar and the pin-shaped or sleeve-shaped contact element to a busbar of the energy supply unit.

9. The fuel cell system as claimed in claim 1,
wherein the intermediate piece adjoins at least one of the first and second housings in a water-tight manner directly or indirectly via a peripheral sealing element, the sealing element being received in a peripheral groove of the intermediate piece.

10. The fuel cell system as claimed in claim 1,
wherein the sealing ring is arranged between the tie rod and the contact element.

11. The fuel cell system as claimed in claim 10,
wherein at at least one end, the tie rod is screwed or pressed into a nut or is configured in one piece with the locking element.

12. The fuel cell system as claimed in claim 11,
wherein the locking element is surrounded by an insulating body, the locking element being held in a direction parallel to the tie rod in the insulating body by way of an end section of the busbar, which end section protrudes into the insulating body.

* * * * *